June 23, 1970     I. S. LAWSON     3,516,637
MIRROR SUPPORTING DEVICE
Filed Oct. 9, 1967     2 Sheets-Sheet 1
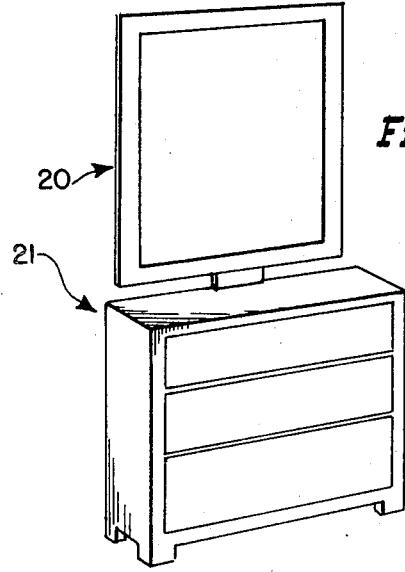
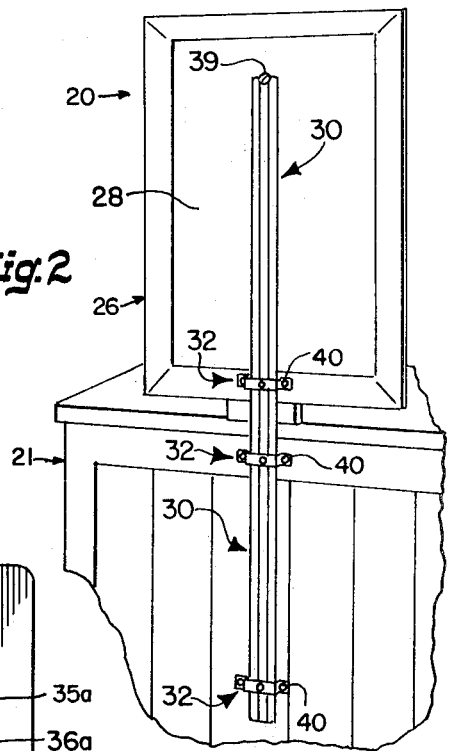
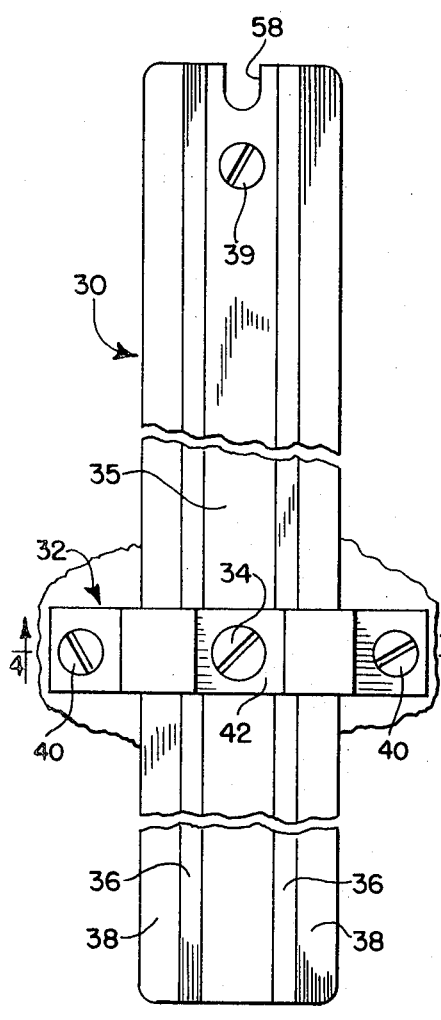
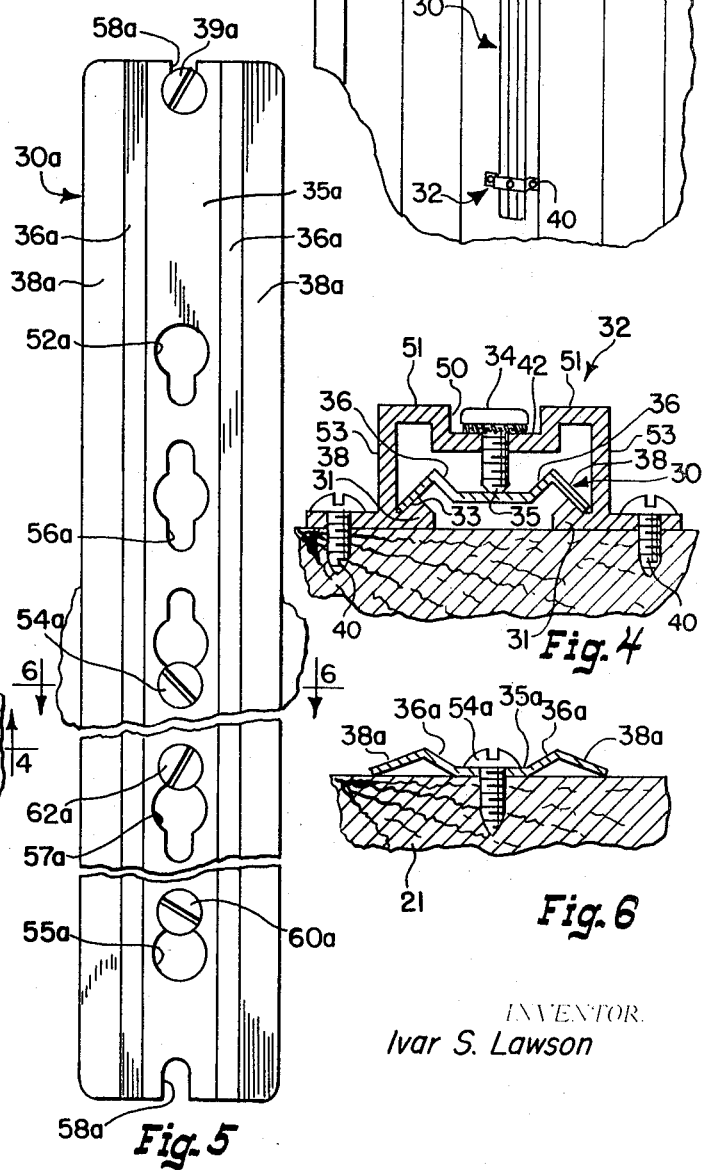
INVENTOR.
Ivar S. Lawson June 23, 1970  I. S. LAWSON  3,516,637
MIRROR SUPPORTING DEVICE
Filed Oct. 9, 1967  2 Sheets-Sheet 2
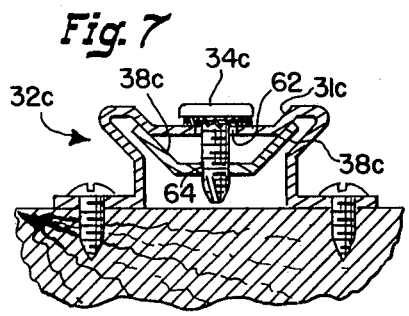
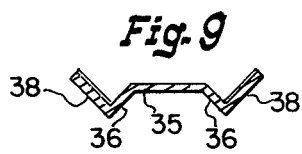
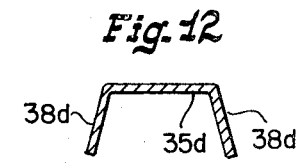
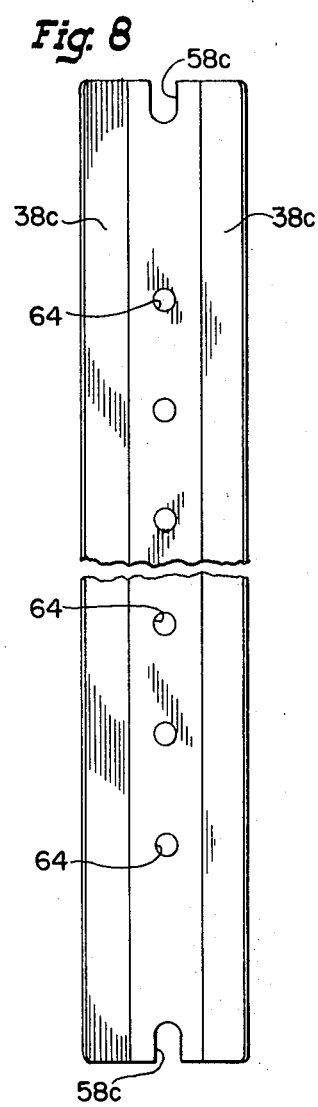
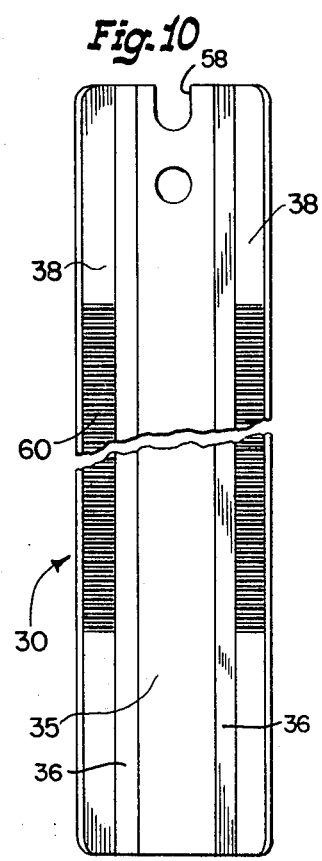
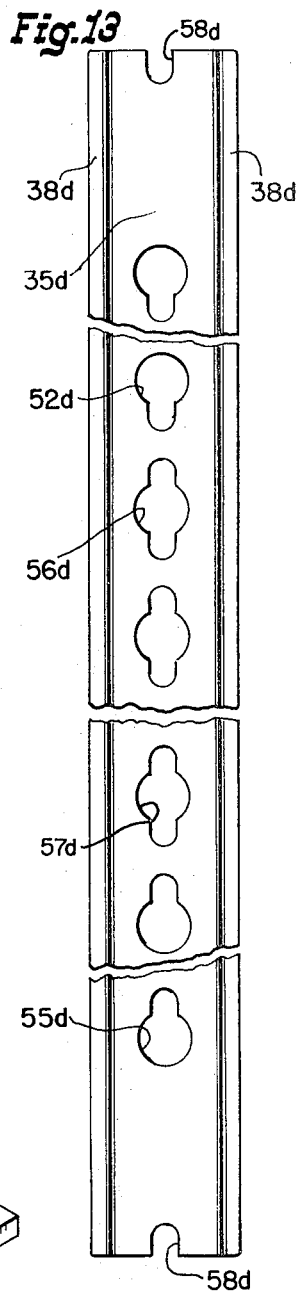
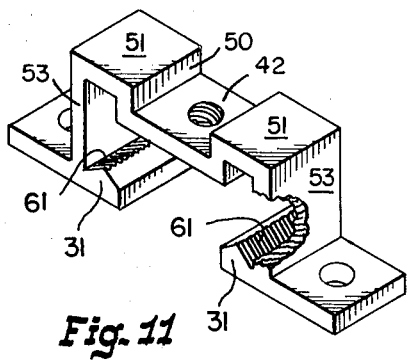
INVENTOR
Ivar S. Lawson

United States Patent Office 3,516,637
Patented June 23, 1970

3,516,637
MIRROR SUPPORTING DEVICE
Ivar S. Lawson, Ashville, N.Y.; Ethel Nelson Lawson, executrix of said Ivar S. Lawson, deceased, assignor to AVM Corporation, Jamestown, N.Y., a corporation of Delaware
Filed Oct. 9, 1967, Ser. No. 678,146
Int. Cl. A47g 1/16
U.S. Cl. 248—477  2 Claims

ABSTRACT OF THE DISCLOSURE

This invention relates to a mounting system for mirrors, which includes a structure fixedly mounted to the back of a mirror frame, the structure extending downwardly and being slidably and adjustably mounted in supports which are fixed to the object with which the mirror is to be associated.

SUMMARY OF THE INVENTION

This invention relates to new and useful improvements relating to the mounting of mirrors and the like, and is particularly directed to mirror supports which permit the adjustment of a mirror with respect to the furniture piece to which the mirror is to be associated, this arrangement permitting adjustment of the elevation of the mirror.

Another object of the invention is the provision of a mounting of the glass described wherein the clamping action between the mirror support and the brackets or the furniture piece produces a clamping action between the two elements, applying no strain either to the mirror or furniture parts, or to the attaching means by which the brackets are affixed to the furniture piece.

A further object is the provision of a mirror mounting having at least one standard or upright which is reversible, each face having different colors so that if it is exposed in use the most suitable color is exposed to the interior of the room. Alternatively, a colored clip or plastic shroud may be secured to and adjusted on the standard to cover the standard, the color of the clip or shroud being selected to match the color of the furniture.

Other objects of the invention include the extreme simplicity and economy of construction of the supporting system which involves a minimum number of parts, as well as the efficiency and dependability of operation and the adaptability for use in differing applications.

With these objects in view as well as other objects which will appear in the course of the specification, reference will be had to the drawings wherein:

FIG. 1 is an elevational view of a dresser or the like showing a mirror attached thereto by means of the mounting system embodying the present invention;

FIG. 2 is an enlarged rear elevational view showing one of the standards and the mounting brackets in detail which constitute the subject of this invention;

FIG. 3 is a fragmentary plan view of the elements of the invention as shown in FIG. 2;

FIG. 4 shows a cross-sectional view taken along the line 4—4 in FIG. 3 showing a mounting bracket with the channel element in clamped position therein;

FIG. 5 is an alternative embodiment of the channel element shown in FIG. 3 which eliminates the bracket elements and utilizes fasteners directly associated to both the supporting structure of the mirror and the back of the supporting furniture piece;

FIG. 6 is a cross-sectional view of the mounting strip shown in FIG. 5 and taken along the line 6—6 in FIG. 5;

FIG. 7 is a cross-sectional configuration and still another embodiment of the invention;

FIG. 8 is a top view of the standard utilized in the combination shown in FIG. 7;

FIG. 9 is a cross-sectional configuration and still another embodiment of a mounting standard;

FIG. 10 is a top view of the mounting standard shown in FIG. 9;

FIG. 11 shows a bracket used in conjunction with the mounting standard shown in FIG. 10; and FIGS. 12 and 13 are a cross-sectional view of a top view of still another modified form of the invention.

Referring to the form of the invention shown in FIGS. 1–4 the numeral 21 applies to a furniture piece such as a dresser, dressing table, buffet, chest of drawers or the like and the numeral 20 applies generally to a mirror assembly comprising a mirror frame 26 with its backing 28 mounted thereon. The mounting structure by which said mirror assembly is attached to dresser 21 comprises one or more uprights or standards 30 and a plurality of brackets 32 associated therewith. Each of the standards comprises a formed elongated channel which formed configuration enhances the structural strength of the standard. The standard in FIG. 3 comprises an elongated strip of material having a central web 35, an angularly arranged flange 36 at each edge of the web and an additional outwardly extending and angularly arranged flange 38 relative to the aforementioned flange 36. This configuration assures the strength to the standard and permits the use of thinner materials to provide a standard sufficient to permit rigid mounting of the mirror. The standard 30 as shown in FIGS. 1 and 2 is disposed vertically and is attached at its upper end to the backing 28 of the mirror by means of a screw or the like 39 which secures the upper end of the standard 30 fixedly to the mirror backing 28. The standard extends downwardly through a bracket 32 which is best seen and understood by reference to FIG. 4. Thereafter the standard extends downwardly to the vicinity of the dresser 21 and two of the aforementioned brackets 32 are mounted thereon by means of screws 40. In furniture construction quite often a full backing on the dresser 21 is not present in which case, a blind rail (not shown) is provided to which a bracket or brackets 32 may be secured.

Each of the brackets 32 comprises a strap of metal as best seen in FIGS. 3–4 having section 42 perforated, and in this embodiment with a tapped perforation to receive a screw 34. On either side of the portion 42 are a pair of flanges 50 which support a pair of outwardly extending surfaces 51 which together with a portion 42 present a depressed central portion into which head of screw 34 is housed. If bracket 32 does come in contact with the wall, the screw heads 34 do not contact the wall in view of the depression into which they are mounted.

The standard 30 is inserted slidably within the bracket legs 53 which are provided to space the portions 42, 50 and 51 from the back of the mirror and dresser and above the mounting portions 31 which extend both inwardly and outwardly of the bracket legs 53. Careful reference to FIG. 4 will reveal that the internally extending leg portions 31 are provided with clamping surfaces 33 which conform substantially the angular disposition of standard flanges 38 so that flanges 38 may be placed into intimate surface contact with clamping surfaces 33 so as to afford a clamping or locking action therebetween. To obtain this clamping action screw 34 must be of suitable length so that as it is driven into the bracket 32 and against the standard 30 its nose portion 35 will come into impingement and cause a clamping action of the above described type to occur. Thus, a tightening of screw 34 holds the standard firmly and resiliently against the internally extending portion 31 and a slight transverse flexing of the standard which is induced by the screw retains the screw firmly in position to resist any force tending to loosen the screw.

The adjustability of the standard 30 relative to the brackets 32 on the back of the dresser permits mounting of the mirror to different heights relative to the dresser with the attendant benefit that the standard can be readily clamped or unclamped for adjustment to accomplish the elevational change of the dresser and mirror relative to each other.

In FIG. 10 of the drawings I have shown the standard 30 wherein the flanges 38 are provided with either a corrugated surface or a roughened finish 60 and likewise in FIG. 11 of the drawings I have shown the clamping surfaces of internally extending flanges 31 similarly corrugated or roughened at 61. The purpose of this roughening is to assure a fixed positionment of the standard relative to the bracket when screw 34 has been driven home.

In FIG. 5 an alternative form of the mounting system is disclosed. The strip 30a in this instance is formed into a configuration of angularly arranged flanges 36a and 38a in a similar fashion to the flanges shown in FIG. 3. Likewise, the strip 30a is provided at both terminal ends with a notch or aperture 58a, into one of which screw 39a can be mounted to affix the strip to the mirror backing 28. Provided intermediate the two ends of standard 30a are a plurality of key shaped apertures 52a, 55a, 56a and 57a, which are arranged to provide adequate mounting facilities for the standard relative to the mirror backing and dresser. Key hole apertures 52a and 56a, which are provided in the upper portion of the standard, are adapted to receive screws 54a, which in turn cooperate with screw 39a in order to support the weight of the mirror. Likewise at the other end of the strip apertures 55a and 57a cooperate with screws 60a and 62a to support the weight of the mirror transmitted by the standard. Screws 39a, 54a, 60a and 62a, seek a position of minimum dimension relative to the keyhole apertures so that the screw heads serve as a trap against the standard becoming unassembled relative to them.

In FIG. 6 which is taken along line 6—6 in FIG. 5, the standard is shown secured to the back of the dresser 21 and is shown in a position where the angular flanges 36a and 38a each diverge from the dresser back to a point of juncture spaced away from the backing surface. It will be apparent to those who understand the invention that the mounting strip could be reversed and the juncture of flanges 36a and 38a be in intimate contact with the dresser back 21. This formed configuration of the standard presents a rigid structure which when clampingly mounted against the surface of the dresser 21 and the mirror 20 gives good rigidity and facilitates mounting as previously indicated. Another form of the standard shown in FIG. 5 is shown in FIG. 12 wherein the cross-sectional configuration of the standard is substantially in the form of a U. Like numerals have been applied to like parts with the suffix "d" applied.

The last embodiment shown is best portrayed by FIGS. 7 and 8. This embodiment contemplates the use of a formed standard presenting an intermediate portion and angularly arranged flanges 38c used in conjunction with a bracket 32c which presents surfaces 31c against which the flanges 38 can be impinged. The major difference in the invention shown in FIG. 7 relates to the fact that a clearance hole 62 is provided through which the screw threaded fastener 34c is passed and a tapped aperture 64 is provided in the standard which permits the standard to be drawn into initimate contact relative to the bracket as the screw is driven home. In this form a plurality of apertures 64 are provided to permit various positionments of the bracket 32c to afford the same type of adjustability as has been previously described relative to other embodiments.

It should be noted that the form of invention called for in FIG. 3 can be provided with apertures 52a, 55a, 56a and 57a and have a double utility as related to the description of the invention set forth relative to FIGS. 3 and 5. In the event a standard 30a is used with brackets 32 as shown in FIG. 3, the tip of screw 34 must present a greater surface contacting area than the area of the apertures.

What I claim as new and desire to protect by Letters Patent is:

1. A mirror mounting of the class described comprising in combination:
   a standard, said standard being in the form of an elongated channel having a central portion and a pair of flange portions which diverge outwardly from adjacent opposite edges of said central portion and cooperate therewith to provide a rigid standard construction; and
   at least one mounting bracket of generally U-shaped configuration, said bracket having an intermediate portion and a pair of legs extending therefrom, said intermediate portion being provided with a threaded aperture and a standard clamping screw mounted therein, said legs carrying transversely extending mounting portions adjacent the free ends thereof, each said mounting portion including a pair of substantially aligned portions extending inwardly and outwardly of said legs, said outwardly extending portions being apertured to receive fasteners adapted to facilitate mounting of said bracket on the back of a mirror or the like, said inwardly extending portions defining clamping surfaces arranged at an acute angle with respect to facing surfaces of said legs, said standard having a width substantially equal to the distance between said facing leg surfaces, said flanges being angularly related such that when said standard is slidably positioned within said bracket said flanges may be disposed substantially parallel to and in surface engagement with said clamping surfaces, said clamping screw being adapted to be adjusted into bearing engagement with said central portion of said standard so as to force said flanges into frictional surface engagement with said clamping surfaces, and said facing surfaces of said legs constraining relative angular divergence of said flanges and accompanying separation thereof from said clamping surfaces upon adjustment of said clamping screw as aforesaid.

2. A mirror mounting according to claim 1, wherein said inwardly and outwardly directed portions of each pair cooperate to define mounting surfaces engageable with said mirror back or the like, and said clamping surfaces and said flanges are provided with cooperating corrugations adapted to increase the surface area thereof to be disposed in frictional engagement, said flange corrugations extending in a direction transversely of said standard.

References Cited

UNITED STATES PATENTS

| 298,463 | 5/1884 | Guedle | 248—354 |
|---|---|---|---|
| 2,852,222 | 9/1958 | Bogar | 248—295 |
| 2,893,666 | 7/1959 | Cousins | 248—476 |

ROY D. FRAZIER, Primary Examiner

F. DOMOTOR, Assistant Examiner